UNITED STATES PATENT OFFICE 2,567,927

ALIPHATIC ORTHOFORMIC ESTERS

John G. Erickson, Greenwich, Conn., assignor to American Cyanamid Company, New York, N. Y., a corporation of Maine No Drawing. Application February 4, 1949, Serial No. 74,700

13 Claims. (Cl. 260—615)

The present invention relates to the preparation of aliphatic orthoformic esters.

It is an object of the present invention to prepare aliphatic orthoformic esters by the reaction of hydrogen cyanide, an aliphatic alcohol, and hydrogen chloride. It is a further object to react the three reactants above named in a safe manner. A still further object of the invention is to prepare an orthoformic ester from hydrogen cyanide in a one-step reaction. Additional objects will become apparent in the description of the invention that follows.

It has been known for some years that hydrogen cyanide could be converted to an iminoether by reacting it with an equimolar amount of an alcohol in ether solution and in the presence of excess hydrogen chloride. Under these conditions an iminoether hydrochloride is formed and settles out of the solution:

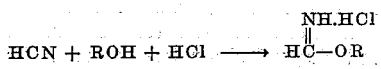

The iminoether hydrochloride may be filtered off, stripped of traces of excess hydrogen chloride (necessary step according to Pinner), and reacted with more alcohol to form the desired ortho ester according to the following equation:

This method, besides involving two separate steps, is open to various objections. Frequently, the iminoether hydrochlorides separate from the ether solution only after long standing. Also, long periods of chilling in the icebox are frequently necessary to obtain the salt in crystalline condition and good yield. Furthermore, the reaction between hydrogen cyanide, hydrogen chloride, and alcohol in ether solution tends to be explosive if good conditions of stirring and cooling are not maintained. The use of ether is, per se, a hazard and rather costly, since it cannot be completely recovered for recycling. As above noted, the iminoether hydrochloride must be stripped free of hydrogen chloride, and such a meticulous process is not easily applicable to large scale production, particularly since all moisture must be kept from the product.

In view of the above disadvantages, various attempts have been made to find a one-step process whereby hydrogen cyanide and an alcohol could be reacted to give an orthoformic ester directly. Such an attempt was made by Pinner and reported in his book "Die Imidoaether," page 18 (Berlin, 1892). In this experiment Pinner passed hydrogen chloride into a solution of hydrogen cyanide in a considerable excess of alcohol with stirring and external cooling. However, despite repeated attempts, the reaction always resulted in an explosion. Pinner's work discouraged further effort in this field.

The surprising discovery has now been made that if the alcohol and hydrogen chloride are mixed first, and then the hydrogen cyanide added to the mixture, no explosion results. The addition of hydrogen chloride to the alcohol may be carried out at room temperature. However, at this temperature there is some reaction of the hydrogen chloride with the alcohol to produce an alkyl chloride and water. When hydrogen cyanide is added to such a solution, the water reacts with the imidoether hydrochloride and orthoformic esters that are formed in the solution to decompose them, thereby reducing the yield of orthoformic ester. Consequently, if the addition of hydrogen chloride to the alcohol is carried out under conditions that do not result in the formation of byproduct water, the yield of orthoformic ester will be improved. It is a preferred embodiment of the invention, therefore, to effect the addition of hydrogen chloride to the alcohol under cold conditions such as 0°–5° C.

The addition of hydrogen chloride to the alcohol is exothermic and the solution should be stirred and cooled to prevent the formation of water as above discussed.

The addition of hydrogen cyanide may be made to the mixture of hydrogen chloride-alcohol at any temperature from 0° C. to about 30°–35° C. In view of Pinner's results, it is remarkable that the entire amount of hydrogen cyanide may be added immediately to the solution of hydrogen chloride in the alcohol without danger of explosion. However, it has been found that the addition is perfectly safe.

Another embodiment of the invention is the addition of a solution of hydrogen chloride in an alcohol to an alcoholic solution of hydrogen cyanide.

In either embodiment, there will be a small amount of heat evolved on the addition of hydrogen cyanide to the acidified alcohol, or the acidified alcohol to an alcohol solution of hydrogen cyanide. After the initial mixing, however, no further heat is evolved.

The hydrogen chloride-alcohol-hydrogen cyanide mixture as prepared in either of the two embodiments discussed above is allowed to stand for several hours to allow ammonium chloride to precipitate, and then the solution is ready for distillation.

The following examples illustrate but do not limit the invention.

Example 1

183 parts of methanolic hydrogen chloride, containing 39.8% by weight of hydrogen chloride, was added over a period of 1½ hours to a well stirred solution of 57 parts of anhydrous hydrous cyanide in 274 parts of anhydrous methanol. The temperature of the mixture was held at 3°–5° C. during this addition by means of an ice bath. The mixture was allowed to warm gradually to 26° C. After 44 hours the mixture was filtered and distilled to dryness. The distillate was redistilled, methyl formate and excess hydrogen cyanide and methanol being removed from the distillate by fractionation through an efficient column. The yield of methyl orthoformate was 26.0 parts, or 12.3% of theoretical.

Example 2

73 parts of anhydrous hydrogen chloride was dissolved in 384 parts of anhydrous methanol at a temperature of about 25° C. The mixture was then cooled to 2° C., stirred, and to it was added, as rapidly as it could be poured in, a cold solution of 162 parts of anhydrous hydrogen cyanide in 192 parts of anhydrous methanol. The mixture was held at 2° C. for 10 hours, then allowed to warm to 24° C. 44 hours after the mixing, the mixture was filtered and distilled. The distillate was fractionated through a good column to give 79.9 parts (37.7% yield) of methyl orthoformate.

Example 3

Anhydrous gaseous hydrogen chloride was passed into 384 parts of anhydrous methanol until 73.3 parts had been absorbed. The temperature was held at about 25° C. during this step. To this solution was then added, within a minute, a solution of 162 parts of anhydrous hydrogen cyanide in 500 parts of methanol, followed immediately by an additional 460 parts of methanol. The mixture was held at 21°–24° C. for 48 hours, then filtered and distilled. Fractionation gave 100.5 parts (47.1% yield) of methyl orthoformate.

Example 4

Gaseous anhydrous hydrogen chloride was bubbled into 404 parts of anhydrous methanol until 58.6 parts had been absorbed. The mixture was held at 25° C. during this step. To this mixture was then added, within a period of a minute, a solution of 206 parts of anhydrous hydrogen cyanide in 606 parts of anhydrous methanol. The mixture was held at 21°–27° C. for 92 hours, then distilled without first being filtered. Fractionation of the distillate gave 80.8 parts (47.6% yield) of methyl orthoformate.

Example 5

Gaseous anhydrous chloride was passed into 400 parts of anhydrous methanol until 57 parts had been absorbed. The temperature was held at 25° C. during this process. To this solution was then added, within a minute, a solution of 126.8 parts of anhydrous hydrogen cyanide in 610 parts of anhydrous methanol. The mixture was allowed to stand for 92 hours at 21°–26° C., then was distilled. Fractionation of the distillate gave 73.1 parts (44.2% yield) of methyl orthoformate.

Example 6

Anhydrous gaseous hydrogen chloride was passed into 401 parts of anhydrous methanol until 54.9 parts had been absorbed. The mixture was kept at a temperature of 5° C. during this step. To this solution was then added a cold (5° C.) solution of 202 parts of anhydrous hydrogen cyanide in 609 parts of anhydrous methanol. The mixture was held at 1°–2° C. for 8 hours, then allowed to warm slowly to 25° C. 92 hours after the start of the reaction, the mixture was distilled. Fractionation of the distillate gave 79.5 parts (50.0% yield) of methyl orthoformate.

Example 7

Anhydrous gaseous hydrogen chloride was passed into 400 parts of anhydrous methanol until 55.8 parts had been absorbed. The temperature of the mixture was kept at 5° C. during this step. To this cold solution was then added, as quickly as possible, another cold solution of 124 parts of anhydrous hydrogen cyanide in 610 parts of anhydrous methanol. The mixture was held at 1°–2° C. for 7 hours, then allowed to warm slowly to 24° C. 92 hours after the start of the reaction, the mixture was distilled. Fractionation of the distillate gave 75.2 parts (46.4% yield) of methyl orthoformate.

Example 8

Gaseous anhydrous hydrogen chloride was passed into 410 parts of anhydrous methanol until 55.9 parts had been absorbed. The temperature of the mixture was kept at 5° C. during this process. A cold (5° C.) solution of 202 parts of anhydrous hydrogen cyanide in 600 parts of anhydrous methanol was then added as rapidly as possible to the methanolic hydrogen chloride solution. The mixture was allowed to warm to 25° C. and held at this temperature until 92 hours had elapsed since the mixing. The mixture was then distilled to dryness. The distillate was fractionated to give 81 parts (50.2% yield) of methyl orthoformate.

Example 9

At 5° C., 42 parts of gaseous anhydrous hydrogen chloride was dissolved in 399 parts of anhydrous methanol. To this solution was then added, within a period of one minute, a cold (5° C.) solution of 148.5 parts of anhydrous hydrogen cyanide in 817 parts of anhydrous methanol. The mixture was allowed to warm to 25° C.. and was held at that temperature until 92 hours had elapsed since the mixing of the solutions. The mixture was distilled and the distillate was fractionated to yield 63.4 parts (51.9% yield) of methyl orthoformate.

Example 10

Dry gaseous hydrogen chloride was passed into 230 parts of absolute ethanol until 36.5 parts had been absorbed. The temperature was held at approximately 25° C. during this process. To this solution a solution of 81 parts of hydrogen cyanide in 184 parts of absolute ethanol was added as quickly as possible. The mixture was held at 21°–24° C. for 44 hours, then filtered and distilled. Fractionation of the distillate gave 34.0 parts (22.9% yield) of ethyl orthoformate.

Example 11

At 25° C., 36.8 parts of dry hydrogen chloride gas was dissolved in 370 parts of dry n-butyl alcohol. To this solution was then added, as quickly as possible, a solution of 81 parts of anhydrous hydrogen cyanide in 296 parts of dry n-butyl alcohol. The mixture was held at 21°–24° C. for 66 hours and was then filtered and distilled. Fractionation of the distillate, under atmospheric pressure and reduced pressure, gave 93.7 parts (42.5% yield) of butyl orthoformate.

The proportions of reactants may be varied considerably and still give a fair yield of orthoformic ester. The yield of orthoformic ester increases with increasing ratio of hydrogen cyanide to hydrogen chloride, but the rate of increase becomes small when said ratio reaches 5 mols of hydrogen cyanide to 1 mol of hydrogen chloride. The amount of high boiling byproducts also increases with increasing amount of hydrogen cyanide.

The hydrogen chloride:alcohol ratio may be varied within wide limits. As little as 3 or 4 mols of alcohol can be used for each mol of hydrogen chloride and one may use as much as 40 or 50 mols of alcohol per mol of hydrogen chloride.

As examples of alcohols suitable for use in this reaction, there are the following:

| | |
|---|---|
| Methanol | Sec. butyl alcohol |
| Ethanol | Cyclohexyl alcohol |
| Propyl alcohol | 2-ethylhexanol |
| Isopropyl alcohol | Beta-phenylethyl alcohol |
| N-Butyl alcohol | Ethylene chlorohydrin |
| Isobutyl alcohol | |

The yield of ortho ester increases, and the amount of high boiling byproducts decreases, with an increasing amount of alcohol, the hydrogen cyanide and hydrogen chloride remaining constant. However, the rate of change becomes small when the excess of alcohol becomes very large.

The total reaction time may be varied over wide limits. However, under virtually all conditions the reaction is over within 24 hours.

While the reaction may be carried out at temperatures in excess of room temperature, it is preferred not to permit the reaction mass to reach a temperature in the neighborhood of 50° C. At this and higher temperatures, the reaction mass becomes unstable and may explode.

The above examples show the separation of ammonium chloride from the reaction mass by filtration, but other separation methods such as decantation and the like, well known in the art, are obviously suitable.

While the invention has been described with particular reference to specific embodiments, it is to be understood that it is not to be limited thereto but is to be construed broadly and restricted solely by the scope of the appended claims.

I claim:

1. The method comprising intermixing hydrogen cyanide and a solution of hydrogen chloride in an alkyl monohydric alcohol at a temperature not in excess of about 35° C. to form an orthoformic ester and recovering the thus-formed ester.

2. The method comprising adding hydrogen cyanide to a solution of hydrogen chloride in an alkyl monohydric alcohol at a temperature not in excess of about 35° C. to form an orthoformic ester and recovering the thus-formed ester.

3. The method comprising adding a solution of hydrogen chloride in an alcohol to a solution of hydrogen cyanide in an alkyl monohydric alcohol at a temperature not in excess of about 35° C of the same formula to form an orthoformic ester and recovering the thus-formed ester.

4. The method comprising preparing a solution of hydrogen chloride in a monohydric alkyl alcohol at a temperature within the approximate range 0°–26° C., passing hydrogen cyanide into the thus-formed solution, whereby an orthoformic ester is formed, and recovering the thus-formed ester.

5. The method according to claim 4 in which the hydrogen cyanide is added to the reaction mass at a temperature of less than 35° C.

6. The method comprising preparing a solution of hydrogen chloride in a monohydric alkyl alcohol at a temperature within the approximate range 0° C. to 26° C., passing hydrogen cyanide into the thus-formed solution at a temperature of less than 35° C., whereby an orthoformic ester is formed, continuing the reaction until the precipitation of ammonium chloride is substantially complete, separating said ammonium chloride, and distilling the orthoformic ester from the residual liquor.

7. The method according to claim 6 in which the alcohol is methanol and the hydrogen cyanide is added to the reaction mass at a temperature within the approximate range 0°–26° C.

8. The method according to claim 6 in which the alcohol is ethanol and the hydrogen cyanide is added to the reaction mass at a temperature within the approximate range 0°–26° C.

9. The method according to claim 6 in which the alcohol is n-butanol, and the hydrogen cyanide is added to the reaction mass at a temperature within the approximate range 0° to 26° C.

10. The method comprising adding hydrogen cyanide to a solution of hydrogen chloride in a monohydric alkyl alcohol at a temperature within the approximate range 0°–35° C., to form an orthoformic ester, continuing the reaction to precipitate ammonium chloride substantially completely, removing said ammonium chloride from the reaction mass, and distilling the thus-formed orthoformic ester from the residual liquor.

11. The method according to claim 10 in which the alcohol is methanol, and the temperature is within the approximate range 0° to 26° C.

12. The method according to claim 10 in which the alcohol is ethanol, and the temperature is within the approximate range 0° to 26° C.

13. The method according to claim 10 in which the alcohol is n-butanol, and the temperature is within the approximate range 0° to 26° C.

JOHN G. ERICKSON.

OTHER REFERENCES

McElvain et al.: "Jour. Am. Chem. Soc.," vol. 64 (1942), pages 1825–1827.

Post: "Chemistry of Aliphatic Ortho-Esters," (1934), pages 21–26, Reinhold, N. Y.

Pinner: "Berichte," vol. 16 (1883), pages 352–359, 1643–1647.